United States Patent [19]
Yamazaki

[11] Patent Number: 4,599,022
[45] Date of Patent: Jul. 8, 1986

[54] CLAMP PROFILING CONTROL METHOD
[75] Inventor: Etsuo Yamazaki, Hachioji, Japan
[73] Assignee: Fanuc Ltd., Tokyo, Japan
[21] Appl. No.: 498,191
[22] PCT Filed: Sep. 14, 1982
[86] PCT No.: PCT/JP82/00370
    § 371 Date: May 13, 1983
    § 102(e) Date: May 13, 1983
[87] PCT Pub. No.: WO83/01032
    PCT Pub. Date: Mar. 31, 1983
[30] Foreign Application Priority Data
    Sep. 14, 1981 [JP] Japan .................. 56-145330
[51] Int. Cl.$^4$ ........................... B23Q 35/06
[52] U.S. Cl. ................... 409/84; 51/2 AA;
    318/578; 364/474; 409/127; 409/132
[58] Field of Search ........ 409/84, 131, 132, 127;
    51/2 AA; 364/474; 318/578

[56] References Cited
U.S. PATENT DOCUMENTS
4,386,408 5/1983 Imazeki et al. .................. 364/474
4,456,864 6/1984 Imazeki et al. .................. 318/578

FOREIGN PATENT DOCUMENTS
55-106754 8/1980 Japan .

Primary Examiner—Z. R. Bilinsky
Attorney, Agent, or Firm—Staas & Halsey

[57] ABSTRACT

A clamp profiling control method in which a profiling feed operation, a profiling starting point return operation and a pick-feed operation are performed alternately, and in which a clamp feed is performed at a set clamp level (LCZ), which method includes specifying a clamp region (H1) by storing an initial position (A) at which clamp feed is performed and a position (B) at which clamp feed is no longer performed during the course of profiling feed, executing repetitive clamp profiling control within the clamp region while changing the clamp level (LCZ) and, when the clamp feed is no longer performed even once in the course of clamp profiling control, setting the clamp level to an initial value and proceeding to the next profiling region where the profiling feed operation, profiling starting point return operation and pick-feed operation are performed.

5 Claims, 7 Drawing Figures

CLAMP PROFILING CONTROL METHOD

DESCRIPTION

This invention relates to a clamp profiling control method and, more particularly, to a clamp profiling control method through which profiling machining can be performed with excellent efficiency.

In profiling machining, a so-called clamp profiling method is available. With clamp profiling, (a) a level (referred to as the clamp level) is preset in the direction of profiling depth, (b) a stylus profiling the shape of a model eventually arrives at the clamp level, (c) when this occurs, the profiling operation is suspended and a clamp feed is performed, thereby preventing an excess amount of cutting, and (d) thereafter, clamp profiling is performed a plurality of times by successively changing the clamp level each time the profiling along the profiling path and clamp feed occurs.

FIG. 1 is an explanatory view of clamp profiling, in which L1, L2 ... Ln, Ln+1 denote first, second, ... n-th, (n+1)-th clamp levels, STL represents a stylus, and MDL represent a model. In the first clamp profiling operation, the stylus STL is fed along the model to the first clamping level L1 (A1→B1), then is clamp fed from B1 to C1, then from C1 to D1 along the model after the clamp feed. Thereafter, the foregoing steps are repeated upon performing a pick-feed in a direction orthogonal to the plane of the paper. The first clamp profiling operation ends upon completion of a number of the pick-feed cycles. When the first clamp profiling operation is completed, the stylus is returned to point A1, the clamp level is changed to the second clamp level L2, and the stylus is transported along the path A1→B2→C2→D2. Thereafter, the clamp level is changed in similar fashion each time the first clamp profiling operation ends, eventually bringing the profiling work to an end.

In the prior art, as shown in FIG. 2, profiling control is performed in the following manner in a case where the profiling path starts at ST and ends at ED, along which path clamp profiling is performed at locations H1, H2. Specifically, (a) profiling feed in the direction of the arrows and pick feed are repeated starting from the starting point ST, (b) clamp profiling is performed at each of the locations H1, H2, (c) after clamp profiling, profiling feed and pick feed are repeated up to the end point ED, (d) profiling feed is carried out again from the starting point ST, and (e) performing a clamp feed when the stylus moves below the new clamp levels at locations H1, H2, the operation reaching the end point ED. The foregoing activity is repeated again and again. Thus, when a plurality of the locations at which the clamp feed is performed are dispersed in the profiling path, profiling according to the conventional method is performed a plurality of times even at portions other than the clamp feed locations, resulting in wasted machining time and poor efficiency.

Accordingly, the object of the present invention is to provide a novel clamp profiling control method through which profiling can be controlled with excellent efficiency even when there are clamp profiling areas in a profiling path.

SUMMARY OF THE INVENTION

A clamp profiling control method in which a profiling feed operation, a profiling starting point return operation and a pick-feed operation are performed alternately, and in which a clamp feed is performed at a set clamp level. Provided are first memory means for storing an initial position at which clamp feed is performed, second memory means at which clamp feed is no longer performed during profiling feed, and clamp level setting means capable of successively changing the clamp level. Repetitive profiling control is performed, while changing the clamp level in the clamp level setting means, between a position stored by the first memory means and a position stored by the second memory means. When the clamp feed is no longer performed even once in the course of this profiling control, the initial value of the clamp level is set in the clamp level setting means and operation advances to the next profiling region where the profiling feed operation, profiling starting point return operation and pick-feed operation are performed.

DESCRIPTION OF PREFERRED EMBODIMENT

Figure 2:
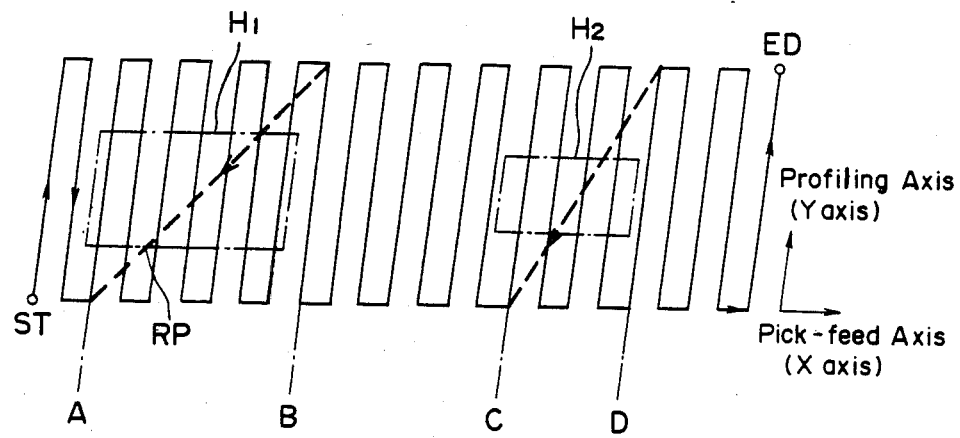
FIG. 2 is an explanatory view of a profiling path.

In a case where a profiling path starts at ST and ends at ED, along which path clamp profiling is performed at locations $H_1$, $H_2$ as shown in FIG. 2, profiling control is performed in the following manner according to the present invention. Specifically, profiling feed in the direction of the arrow (+Y direction) and pick feed in the +X direction are repeated starting from the starting point ST. As for profiling feed at point A, clamp feed is performed when the mechanical position of a tracer head moves below the clamp level, whereby point A is stored in memory. Thereafter, when point B is reached by repeating profiling feed, clamp feed and pick feed, the mechanical position of the tracer head reaches a level higher than the clamp level, so that clamp feed is no longer carried out. Accordingly, point B is stored in memory. Rapid traverse is then performed from point B to point A. When profiling is restored to point A, the clamp level is changed, and profiling feed, clamp feed and pick feed are performed as described above to again arrive at the point B. Repetitive profiling from point A toward point B is carried out until there is no longer any clamp feed. This operation will now be described in detail with reference to FIG. 3. Profiling begins in the +Y direction from starting point ST, a rapid-traverse is performed in the +Z direction when a limit L1 is reached, in the −Y direction toward a limit L2 when a limit L3 is reached, and in the −Z direction when the limit L2 is reached. A decelerated approach is effected when a limit LRA is reached and, when the model is contacted, pick feed of a set quantity is performed so that profiling may be performed again. In repeating these operations, a clamp feed is carried out when a clamp profiling limit (clamp level) LCZ is reached during profiling feed. When this occurs, the position A at which the clamp feed is performed is stored in memory, and the foregoing operations are repeated. When the clamp feed operation ends during profiling feed, the prevailing position B is stored in memory. Then, when the limit L3 is reached by a rapid-traverse in the +Z direction, a rapid-traverse is performed to the position A (the path RP indicated by the bold, broken line in FIG. 3), the clamp profiling limit (clamp level) LCZ is changed by a set amount, and the same operations are then repeated.

When profiling machining has thus been carried out between points A and B until clamp feed is no longer necessary, there is no rapid-traverse toward point A along path RP, the clamp level is set to the initial value, and ordinary profiling feed is carried out from point B to point C (FIG. 2). When point C in FIG. 2 is reached, the clamp feed is carried out again. Therefore, point C is stored in memory, and so is point D at which clamp feed is no longer performed. Then, repetitive profiling machining is carried out between points C and D by an operation similar to that executed between points A and B. Thus, whereas n-number of continuous clamp profiling control operations are performed from the starting point ST to the end point ED in the prior art, with the present invention, n-number of clamp profiling control operations are carried out only in the clamp regions H1, H2, that is, only between points A and B and between points C and D, with a single profiling control operation sufficing from starting point ST to point A, from point B to point C, and from point D to the end point ED. Also, since clamp profiling is being carried out by a rapid-traverse from the end point (B or D) of clamp profiling to the starting point (A or B) of clamp profiling, profiling can be carried out with even greater efficiency.

Figure 4:
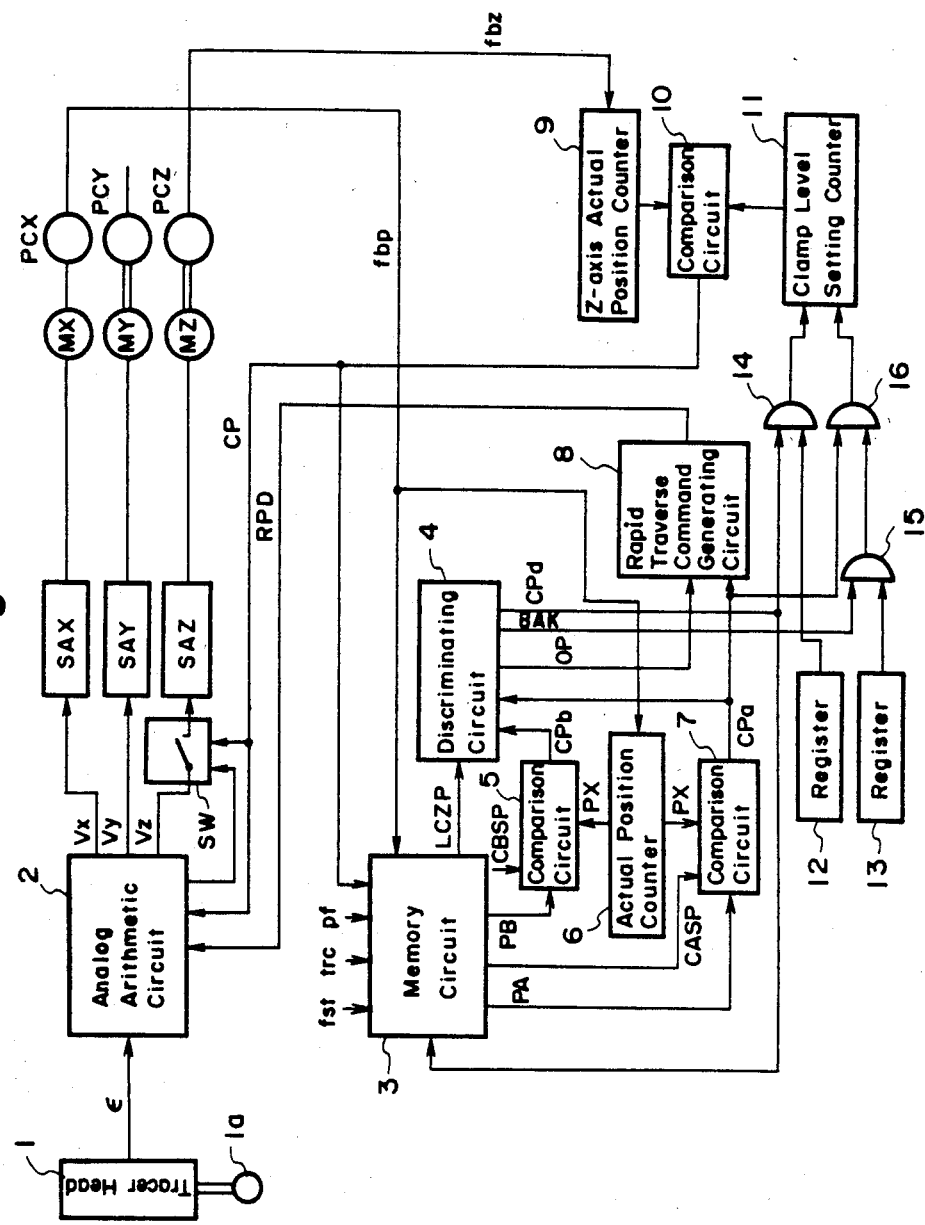
FIG. 4 is a block diagram of an embodiment of the present invention.

FIG. 4 is a block diagram of an embodiment of the present invention and illustrates an essential portion for carrying out the above-described clamp profiling control operation. In FIG. 4, 1 denotes a tracer head having a stylus 1a contacting the surface of a model 1a for producing a displacement signal $\epsilon$, 2 designates a profiling arithmetic circuit, 3 a memory circuit, 4 a discriminating circuit, 5, 7 and 10 comparison circuits, 6 an actual position counter, 8 a rapid-traverse command generating circuit, 9 a Z-axis actual position counter, 11 a clamp level setting counter, 12 a register for setting an initial value of the clamp level, 13 a register for setting an incremental quantity for the clamp level, 14, 15 and 16 AND circuits, SW a switch circuit, SAX, SAY, SAZ servoamplifiers, MX, MY, MZ motors, and PCX, PCY, PCZ pulse coders, the pulse coders PCX, PCY, PCZ being connected to the motors MX, MY, MZ, respectively.

Figure 3:
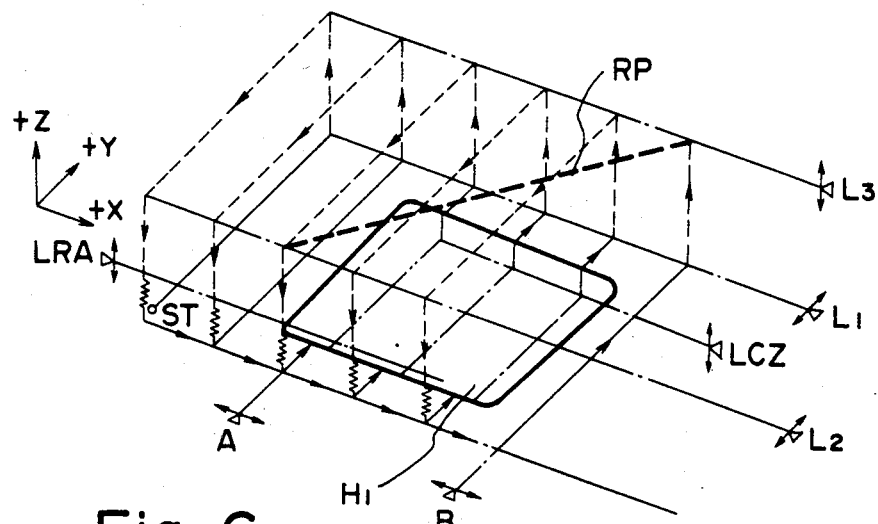
FIG. 3 is a simplified explanatory view of clamp feed to which the clamp profililng control method of the present invention is applied.

The motors MX, MY, MZ are for drive along the pick-feed axis, feed axis and profiling axis, respectively. As shown in FIG. 3, when the limits L1, L2, L3 and LRA are reached, the operation of these motors is controlled by the arithmetic circuit 2 in the rapid-traverse mode or deceleration mode. The switch circuit SW is turned off by a clamp feed signal CP, thereby halting drive of the motor MZ so that a clamp feed is performed. The switch circuit SW is turned on by a displacement signal subsequently obtained from the tracer head 1.

The memory circuit 3 receives the clamp feed signal CP, a signal pf indicating that a +Z rapid-traverse is in progress, a profiling feed signal trc, a first profiling signal fst, a clamp profiling complete signal CPd from the discriminating circuit 4, and pick-feed axis feedback pulses fbp from the pulse coder PCX, and produces a position A signal PA, a position B signal PB, a count inhibit signal CASP, a count inhibit signal CBSP, and a clamp feed operation signal LCZP.

Figure 5:
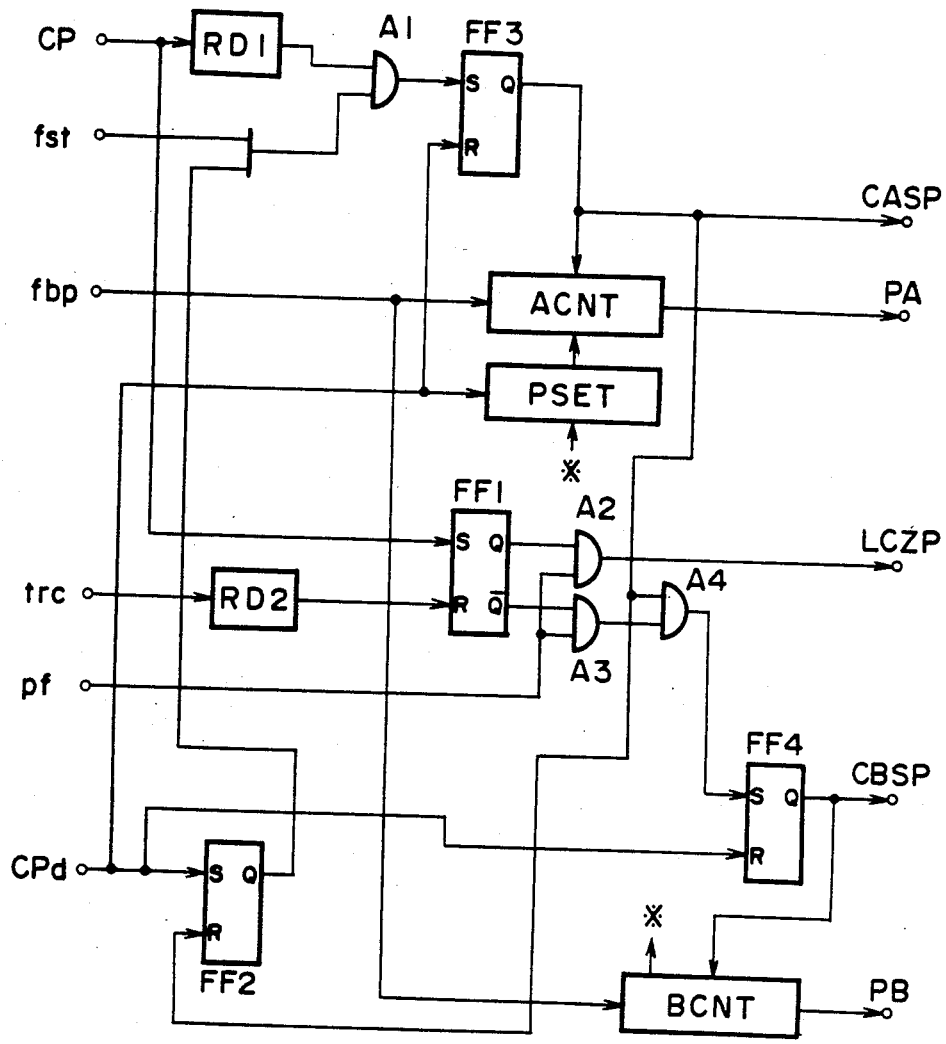
FIG. 5 is a block diagram of an embodiment of a memory circuit.

FIG. 5 is a block diagram showing the essential portion of the memory circuit 3. FF1 through FF4 denote flip-flops, RD1, RD2 positive-going transition detecting circuits, A1 through A4 AND circuits, ACNT, BCNT counters for positions A and B, respectively, and PSET a preset circuit. The counter ACNT for position A stops counting the feedback pulses fbp when the Q output terminal (count inhibit signal CASP) of the flip-flop FF3 goes to logic "1", and the counter BCNT for the position B stops counting the feedback pulses fbp when the Q output terminal (count inhibit signal CBSP) of the flip-flop FF4 goes to logic "1", producing the position B signal PB. When a clamp feed is carried out, the flip-flop FF1 is set by the clamp feed signal CP, the clamp feed operation signal LCZP being set to logic "1" by the next signal pf indicating that a +Z feed is in progress.

The flip-flop FF1 is reset by the positive-going transition of the profiling feed signal trc making the transition from "0" to "1", which signal is generated each time a profiling feed is performed in the +Y direction. Resetting the flip-flop FF1 sends the clamp feed operation signal LZCP to "0".

Figure 6:
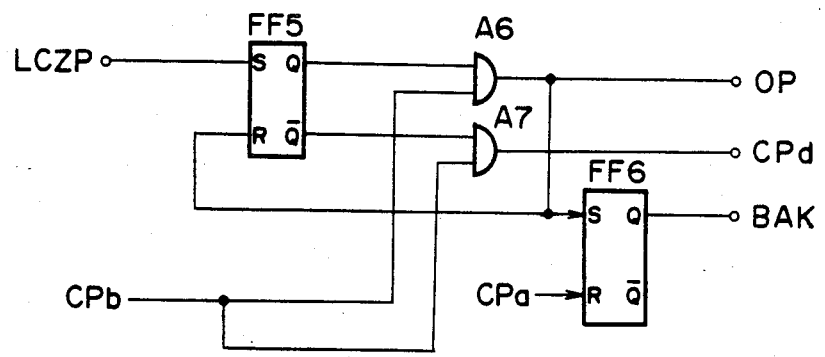
FIG. 6 is a block diagram of an embodiment of a discriminating circuit.

As shown in FIG. 6, the discriminating circuit 4 comprises flip-flops FF5, FF6 and AND circuits A6, A7, the flip-flop FF5 being set by the clamp feed operation signal LCZP. When a coincidence signal CPb is produced by the comparison circuit 7, a clamp profiling in-progress signal OP or a clamp profiling complete signal CPd is produced, depending upon whether or not the flip-flop FF5 is in the set state. The flip-flop FF5 is reset when the clamp profiling in-progress signal OP is produced. The flip-flop FF6 is set by the signal OP, and reset by the coincidence signal CPa.

Figure 7:
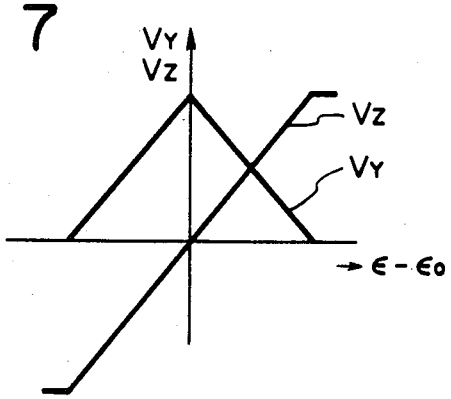
FIG. 7 is an explanatory view showing the relationship between amount of displacement and speed signals Vy, Vz produced by a profiling circuit.

When profiling begins from the starting point ST on the profiling path shown in FIG. 3, the initial value (contents of register 12) of the clamp level is set in the clamp level setting counter 11, and the clamp feed signal CP is "0". The switch circuit SW therefore is in the on state. Owing to the start of profiling, the first profiling signal fst is being applied to the memory circuit 3. Under these conditions, the profiling arithmetic circuit 2 performs a profiling computation and generates speed signals Vy, Vz, in response to which the motors MY, MZ are driven to perform a profiling feed. Note that the arithmetic circuit 2 is adapted to generate the speed signals Vy, Vz, based on the displacement signal $\epsilon$, in accordance with FIG. 7. Specifically, FIG. 7 is a diagram showing the relationship between the feed speeds Vy, Vz and the amount of displacement $\epsilon$ of the stylus in one profiling dimension, with ($\epsilon$-$\epsilon_o$) being plotted along the horizontal axis and feed speed along the vertical axis, where $\epsilon_o$ is a constant amount of displacement. As will be clear from FIG. 7, the feed direction along the profiling axis (Z axis) is decided by the sign of ($\epsilon$-$\epsilon_o$), and the feed speed VZ varies in proportion to the value of ($\epsilon$-$\epsilon_o$). The feed speed Vy along the feed axis (Y axis) varies in inverse proportion to the value of ($\epsilon$-$\epsilon_o$).

When the motors MY, MZ are rotated by the speed signals Vy, Vz, the stylus 1a begins to move and contacts the model, so that the displacement signal $\epsilon$ corresponding to the model shape along the feed axis (Y axis) is delivered from the tracer head 1 to the profiling arithmetic circuit 2. In response, the profiling arithmetic circuit produces the speed signals Vy, Vz conforming to the displacement signal ϵ, the motors MY, MZ being driven by the speed signals Vy, Vz. Pulses fbz from the pulse coder PCZ connected to the motor MZ are applied to the Z-axis actual position counter 9, which counts the pulses fbz up or down in accordance with the direction of movement, the actual position along the Z axis being indicated by the counter contents.

When profiling advances to the +Z rapid-traverse position (limit L1), driving of the motor MY is stopped and motor MZ is driven for rapid-traverse. When the stylus reaches the position of the limit L3, driving of the motor MZ is stopped and motor MY is driven for rapid-traverse. Deceleration takes place with arrival at the position of the limit LRA, and the X-axis motor MX is driven to perform a pick-feed when the stylus 1a contacts the model. The pulses from the pulse coder PCX connected to the motor MX are applied to the memory circuit 3 and actual position counter 6 as feedback pulses fbp, with the contents of the actual position counter 6 being applied to the comparison circuits 5, 7. In the memory circuit 3, the feedback pulses fbp are applied to the counters ACNT, BCNT for the positions A, B, respectively. The contents of the counters ACNT, BCNT for the respective positions A and B therefore represent the position along the pick-feed axis (X axis).

By alternately repeating profiling feed and a series of rapid-traverse return operations and pick-feed operations, point A in FIG. 3 is reached, upon which the mechanical position of the stylus 1a will move below the clamp level during the course of profiling from point A. Specifically, coincidence is established between the contents of the Z-axis actual position counter 9 and the initial value of the clamp level in the clamp level setting counter 11, so that the comparison circuit 10 produces the clamp feed signal CP. In response to the "1" level attained by the clamp feed signal CP, the switch circuit SW is turned off and the motor MZ ceases to be driven. In addition, in response to the "1" level attained by the clamp feed signal CP, the arithmetic circuit 2 produces a predetermined speed signal Vyc to perform a clamp feed solely along the profiling feed axis (Y axis).

The clamp feed signal CP is applied to the memory circuit 3. The positive going transition from "0" to "1" is detected by the positive-going transition detecting circuit RD1, whereby the flip-flop FF3 is set via the AND gate A1. The flip-flop FF1 is set by the clamp feed signal CP. When the flip-flop FF3 is set and the Q output terminal thereof goes to logic "1", the count inhibit signal CASP is produced, in response to which the position A counter ACNT stops counting the feedback pulses fbp to retain the position A in memory. The flip-flop FF2 is reset by the "1" logic at the Q output terminal of the flip-flop FF3.

The +Z rapid-traverse in-progress signal pf is generated when the limit L1 is reached owing to the clamp feed. Since the flip-flop FF1 is in the set state at such time, the AND circuit 2 is open, delivering the clamp feed operation signal LCZP to set the flip-flop FF5 of the discriminating circuit 4.

By performing the clamp feed during the profiling feed and subsequently repeating the series of return rapid-traverse operations and pick-feed operations, the point B in FIG. 3 is reached. When this occurs, clamp feed will not be performed even once during profiling feed. Accordingly, the clamp feed signal CP does not rise and flip-flop FF1 remains in the reset state, with the output of the AND circuit A3 going to "1" in response to the next +Z rapid-traverse in-progress signal. At this time the count inhibit signal CASP is logical "1", so that the output of the AND circuit A4 also is logical "1", thereby setting the flip-flop FF4 to produce the count inhibit signal CBSP. The counter BCNT for the position B therefore stops counting the feedback pulses fbp to hold the position B in memory and apply the position B signal PB to the comparison circuit 5. At this instant, the contents of the actual position counter 6 and of the position B counter BCNT are the same, so that the coincidence signal CPb is applied to the discriminating circuit 4. Since the flip-flop FF5 is in the set state, the clamp profiling in-progress signal OP is delivered through the AND gate A6. In response to the clamp profiling in-progress signal OP, the rapid-traverse command generating circuit 8 which applies a rapid-traverse command signal RPD to the profiling arithmetic circuit 2. The profiling arithmetic circuit 2 responds by commanding a +Z rapid traverse up to the limit L3 and restoring the stylus by rapid-traverse toward the clamp profiling starting point A (refer to the bold broken line in FIG. 3). At this time the feedback pulses fbp enter the actual position counter 6 and are counted up or down depending upon the direction of movement. When the X-axis actual position signal PX becomes equivalent to the position A signal PA, the comparison circuit 7 issues the coincidence signal CPa. The latter enters the rapid-traverse command generating circuit 8 to terminate delivery of the rapid-traverse command signal RPD to the profiling arithmetic circuit 2, whereby the stylus comes to a stop after being fed by rapid traverse to the position of point A. Further, owing to the generation of the clamp profiling in-progress signal OP, the flip-flop FF6 of the discriminating circuit 4 is set, sending a signal BAK to logic "1". In response, the AND circuit 15 opens so that the incremental quantity from the register 13 is applied to the AND circuit 16, after which the stylus returns to the point A and the actual position signal becomes equivalent to the position A signal PA. When this occurs, the comparison circuit 7 issues the coincidence signal CPa, thereby opening the AND circuit 16 so that the incremental value stored in the register 13 is added to the initial value in the clamp level setting counter 11. Thus, the incremental value is added to the clamp level setting counter 1 for the first time when the profiling operation returns to the position of point A. In response to the generation of the coincidence signal CPa, the flip-flop FF6 in the discriminating circuit 4 is reset, so that the signal BAK goes to logic "0".

Profiling is performed between points A and B by repeating the foregoing operations. When it develops that clamp feed no longer takes place even once in profiling from point A toward point B, profiling reaches point B, at which time the flip-flop FF5 will be in the reset state. Therefore, when the coincidence signal CPb from the comparison circuit 5 is applied to the discriminating circuit 4, a clamp feed-inoperative discrimination signal CPd is produced. In response thereto, the AND circuit 14 opens so that the initial value of the clamp level in the register 12 is set in the clamp level setting counter 11. Also, flip-flop FF2 is set by the clamp feed-inoperative discrimination signal CPd, and flip-flops FF3, FF4 are reset thereby. Owing to the preset circuit PSET, the contents of the position B counter BCNT are preset in the position A counter ACNT. Accordingly, the contents of the position A and position B counters ACNT, BCNT, respectively, become equivalent to the contents of the preset position counter 6, and counting of the feedback pulses fbp generated by the pick-feed operation is carried out.

Figure 1:
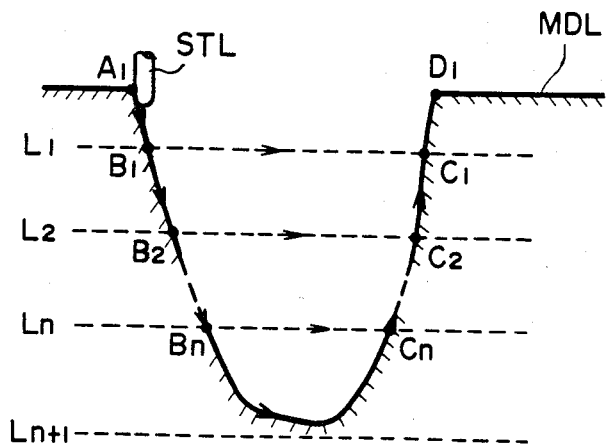
FIG. 1 is an explanatory view of clamp profiling.

When profiling arrives at point C in FIG. 1, the position of point C at which the clamp feed is performed is preserved by the counter ACNT as described in connection with point A above, and the position of point D is preserved by the counter BCNT as described in connection with point B above. When point D is reached, a rapid traverse to point C is performed and profiling is then carried out from point C to point D in repetitive fashion. As the clamp level successively changes and it develops that clamp feed is no longer performed even once, profiling is performed from point D toward the end point ED, with profiling control coming to completion when the end point ED is reached.

The position A counter ACNT and position B counter BCNT can be adapted, through use of other memory means such as a semiconductor memory device, to store the position at which clamp feed is initially performed, and the position at which clamp feed is no longer performed, respectively.

As described above, the present invention has first and second memory means such as the position A counter ACNT and the position B counter BCNT, and clamp level setting means such as the clamp level setting counter 11, with repetitive profiling being performed, while changing the clamp level, between a position at which clamp feed is initially executed, such as position A, and a position at which clamp feed is no longer executed, such as point B, wherein when profiling reaches the point B, a return is effected to point A rapidly for profiling feed and clamp feed to be carried out again. When it develops that clamp feed is no longer carried out even once during the above operation, the clamp level is reset to an initial value and profiling advances to the next region. Thus, a region which does attain the initial value of the clamp level need be profiled only once, and only a region at which clamp feed is performed is profiled repeatedly until the changed clamp level is no longer reached. Accordingly, there is no wasteful profiling work so that profiling can be performed with excellent efficiency.

I claim:

1. A clamp profiling control method in which a stylus is made to alternately perform a profiling feed operation and a pick-feed operation along only one direction of a profiling path, and a profiling starting point return operation, and in which clamp feed is initially performed at an initial set clamp level, said method comprising the steps of specifying a clamp region by storing a starting position at which the clamp feed at said initial set clamp level first occurs and an ending position at which the clamp feed at said initial set clamp level subsequently ceases during the course of said profiling feed in said one direction along said profiling path, successively executing repetitive clamp profiling control over said clamp region, in said one direction along the respective portion of said profiling path between said starting and ending positions, while respectively increasing the clamp level for each said clamp profiling control, wherein, after each said clamp profiling control over said clamp region for which said clamp feed at the respective clamp level occurs, a rapid traverse of said stylus is provided from said ending position to said starting position, and discriminating that the clamp feed is no longer performed during the course of profiling feed of said repetitive clamp profiling control within said clamp region, setting the clamp level to said initial set clamp level, and proceeding further along said profiling path.

2. A clamp profiling control method according to claim 1, comprising storing as said starting position a position along a direction for said pick-feed upon the occurrence of said inital set clamp level, and storing as said ending position the position along said pick-feed direction at which said initial set clamp level no longer occurs.

3. The method of claim 2, wherein said rapid traverse is from the end of the respective profiling feed corresponding to said ending position to the beginning of the respective profiling feed corresponding to said starting position.

4. A clamp profiling control method according to claim 1, wherein said discriminating is performed by detecting that the stylus has not reached the respective clamp level in the course of said repeated profiling control within the clamp region.

5. The method of claim 1, wherein said rapid traverse is from the end of the respective profiling feed corresponding to said ending position to the beginning of the respective profiling feed corresponding to said starting position.

* * * * *

UNITED STATES PATENT AND TRADEMARK OFFICE
CERTIFICATE OF CORRECTION

PATENT NO. : 4,599,022
DATED : July 8, 1986
INVENTOR(S) : Yamazaki

It is certified that error appears in the above-identified patent and that said Letters Patent is hereby corrected as shown below:

Column 3, line 2, "ends during" should be --does not occur during a--.

Signed and Sealed this

Ninth Day of December, 1986

Attest:

DONALD J. QUIGG

Attesting Officer

Commissioner of Patents and Trademarks